(12) United States Patent
Paul et al.

(10) Patent No.: US 7,708,300 B2
(45) Date of Patent: May 4, 2010

(54) POSITIONING GUIDE FOR AIDING CONNECTION OF A FIFTH WHEEL TOWED VEHICLE

(75) Inventors: Steven M. Paul, Granger, IN (US); Andrew M. Murray, Granger, IN (US)

(73) Assignee: Lippert Components, Inc., Goshen, IN (US)

( * ) Notice: Subject to any disclaimer, the term of this patent is extended or adjusted under 35 U.S.C. 154(b) by 268 days.

(21) Appl. No.: 11/923,341

(22) Filed: Oct. 24, 2007

(65) Prior Publication Data

US 2009/0108564 A1    Apr. 30, 2009

(51) Int. Cl.
*B60D 1/36* (2006.01)

(52) U.S. Cl. .................... 280/477; 359/844

(58) Field of Classification Search ............ 280/477; 359/844
See application file for complete search history.

(56) References Cited

U.S. PATENT DOCUMENTS

| | | | | |
|---|---|---|---|---|
| 3,858,966 A | * | 1/1975 | Lowell, Jr. | 359/881 |
| 3,897,086 A | * | 7/1975 | Breford | 280/438.1 |
| 5,180,182 A | * | 1/1993 | Haworth | 280/477 |
| 5,309,289 A | * | 5/1994 | Johnson | 359/871 |
| 5,478,101 A | | 12/1995 | Roberson | |
| 5,482,310 A | | 1/1996 | Staggs | |
| 6,076,847 A | * | 6/2000 | Thornton | 280/477 |
| 6,239,926 B1 | * | 5/2001 | De Shazer | 359/841 |
| 6,499,851 B1 | * | 12/2002 | Kelly et al. | 359/850 |
| 6,923,463 B1 | * | 8/2005 | Ford et al. | 280/477 |
| 6,986,524 B2 | * | 1/2006 | Heitzmann | 280/433 |
| 7,216,885 B1 | * | 5/2007 | Stopka | 280/477 |
| 7,500,690 B2 | * | 3/2009 | Hermon et al. | 280/477 |
| 2007/0075522 A1 | * | 4/2007 | Hermon et al. | 280/477 |
| 2007/0241535 A1 | * | 10/2007 | Salyers | 280/477 |

* cited by examiner

*Primary Examiner*—Lesley Morris
*Assistant Examiner*—Michael R Stabley
(74) *Attorney, Agent, or Firm*—Barnes & Thornburg LLP

(57) ABSTRACT

A positioning guide for aiding connection of a fifth wheel towed vehicle to a towing vehicle, where the fifth wheel towed vehicle has a pin box assembly. A mirror is secured to a cover for the pin box assembly, the mirror being located at an orientation so that it is visible from the towing vehicle when the cover is attached to the pin box assembly. The mirror may be convex and located in a cowl forming part of a cover.

6 Claims, 3 Drawing Sheets

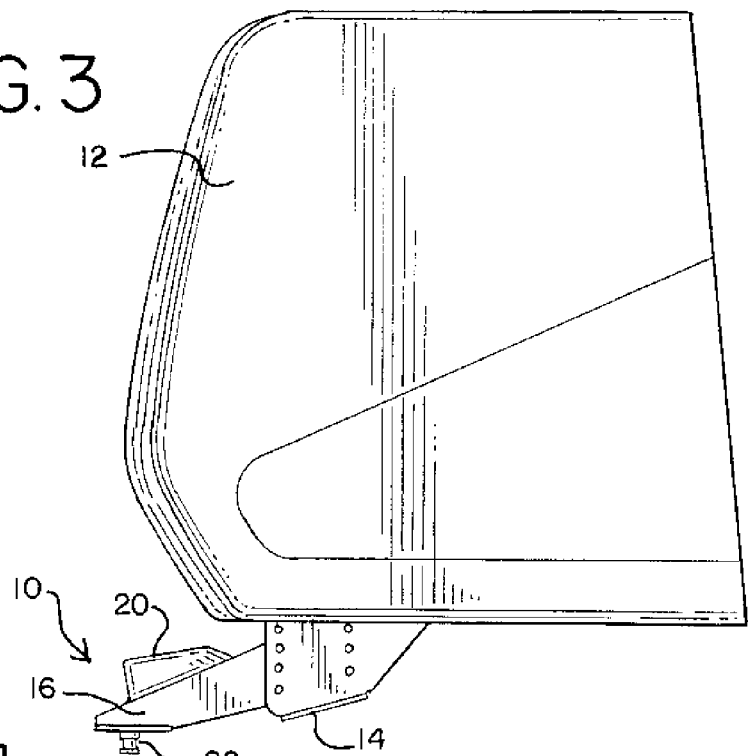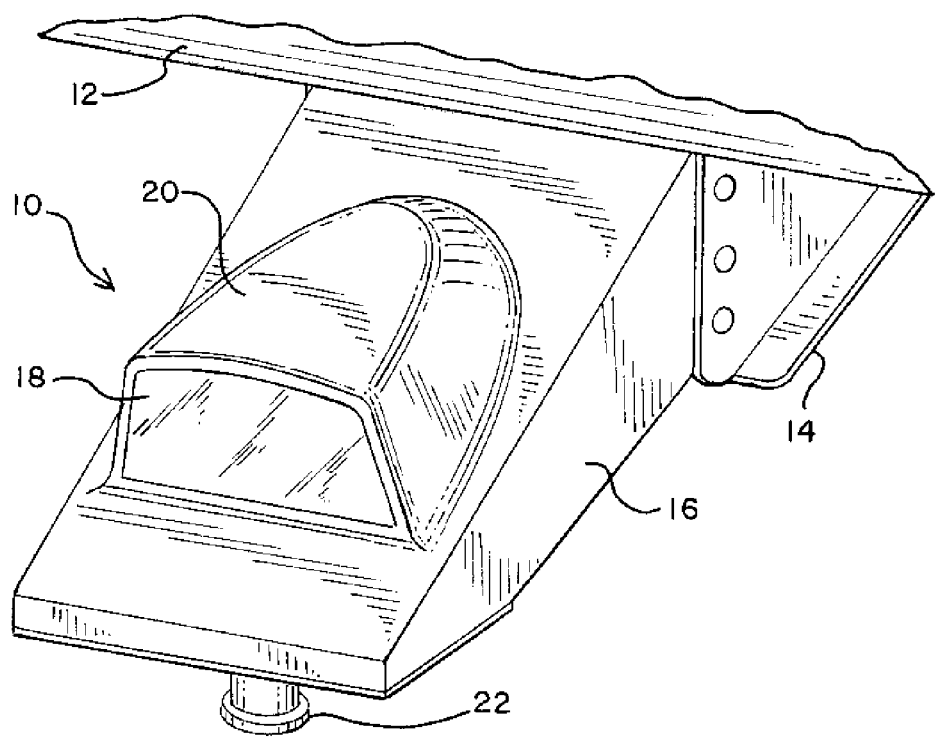

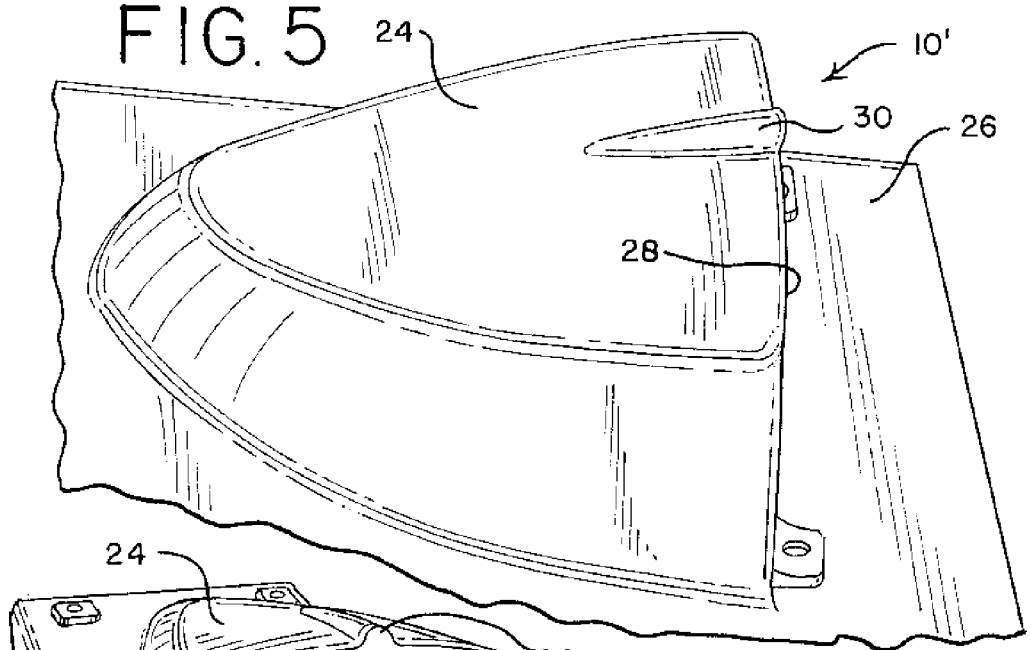
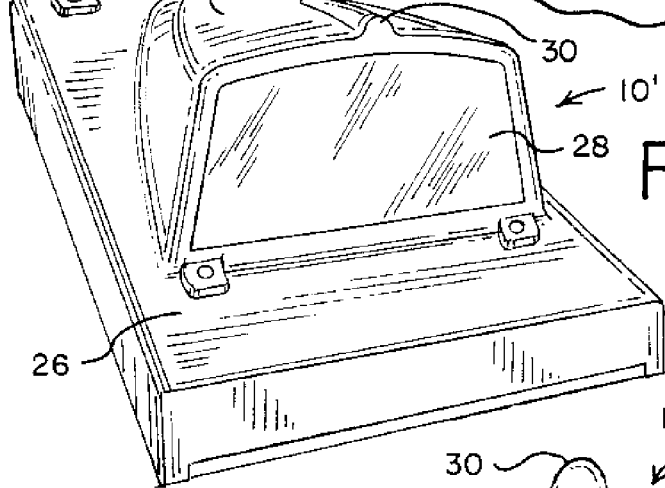
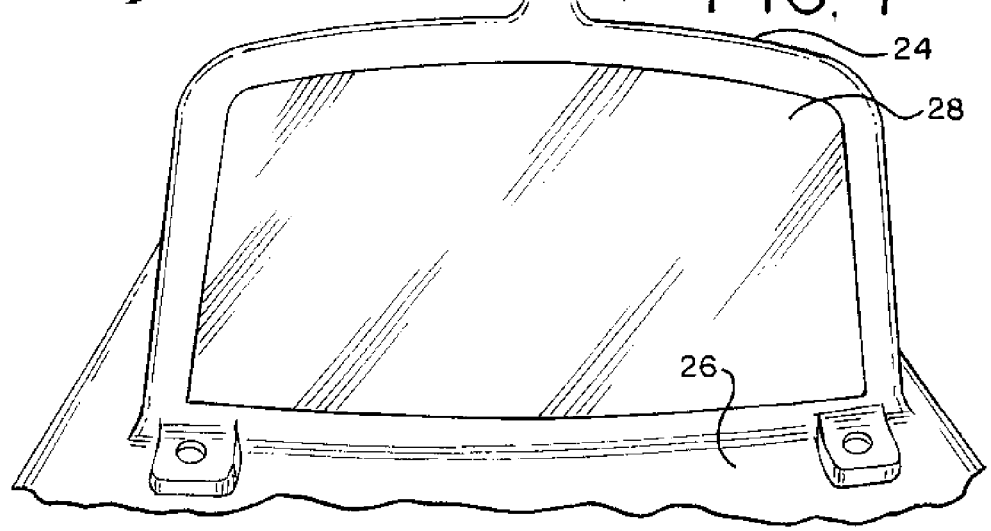

POSITIONING GUIDE FOR AIDING CONNECTION OF A FIFTH WHEEL TOWED VEHICLE

BACKGROUND OF THE INVENTION

This invention relates to fifth wheel towed vehicles, and in particular to a positioning guide for aiding connection of the fifth wheel towed vehicle to a towing vehicle.

Fifth wheel towed vehicles, such as trailers or recreational vehicles, have been used extensively for years. Not only are fifth wheel towed vehicles easier to tow than a conventional trailer, they tend to be more stable and provide an enhanced amount of interior space for the users.

Fifth wheel towed vehicles employ a pin box assembly for attaching the towed vehicle to a towing vehicle. Examples of pin box assemblies are found in U.S. Pat. Nos. 3,897,086 and 6,986,524.

One of the problems encountered when connecting a fifth wheel towed vehicle to a towing vehicle is simply aligning of the two vehicles for their connection. Usually, two people are involved, one backing the towing vehicle while the second person guides the first person as the connection is effected. When only one person is available, however, that becomes problematical.

Alignment devices have been developed for aiding attachment of a towed vehicle to a towing vehicle. Mirrors are employed in U.S. Pat. Nos. 5,180,182 and 5,482,310 for aligning a pulled trailer to a towing vehicle. Published United State Patent Application No. 2007/0075522 discloses locating a reflector on the front portion of a fifth wheel towed vehicle.

SUMMARY OF THE INVENTION

The invention is directed to a positioning guide for aiding connection of a fifth wheel towed vehicle to a towing vehicle, where the fifth wheel towed vehicle has a pin box assembly. The positioning guide includes a cover for the pin box assembly, with the cover being attachable to the pin box assembly, and a mirror secured to the cover and located at an orientation to be visible from the towing vehicle when the cover is in place on the pin box assembly.

In accordance with the preferred form of the invention, the mirror is convex. Preferably, the mirror is located in a cowl on the cover, with the cowl and the cover being integral portions of a unitary structure. A sight line is provided proximate the mirror. Preferably, the sight line comprises a protrusion on the cowl.

BRIEF DESCRIPTION OF THE DRAWINGS

The invention is described in greater detail in the following description of examples embodying the best mode of the invention, taken in conjunction with the drawing figures, in which:

FIG. 3 is a side elevational view thereof, FIG. 4 is an enlarged perspective view of the positioning guide illustrated in FIG. 1, FIG. 5 is a side perspective view of a second form of positioning guide according to the invention, FIG. 6 is a front perspective view thereof, and FIG. 7 is an enlarged elevational view of the positioning guide of FIGS. 5 and 6.

DESCRIPTION OF EXAMPLES EMBODYING THE BEST MODE OF THE INVENTION

Figure 1:
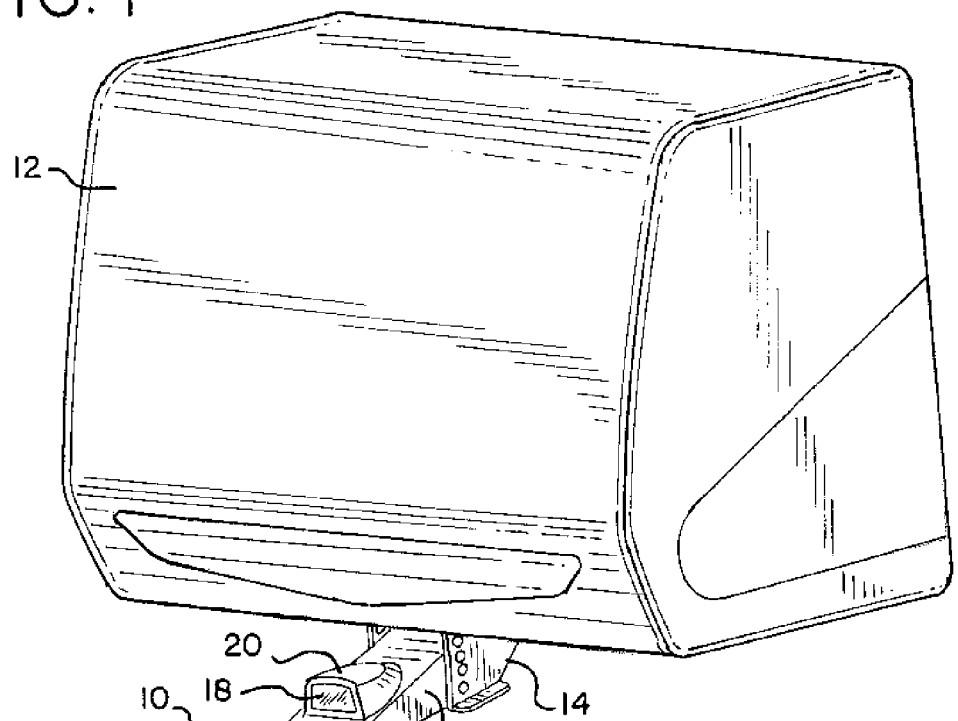
FIG. 1 is a front perspective view of the forward portion of a fifth wheel vehicle having one form of a positioning guide according to the invention.
Figure 2:
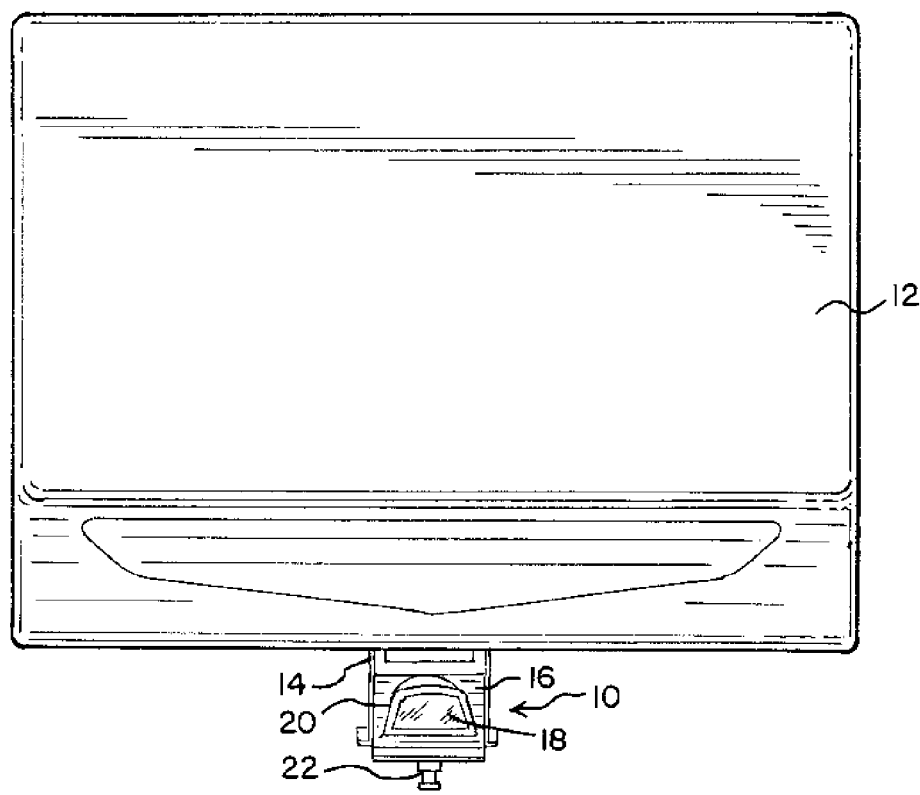
FIG. 2 is a front elevational view thereof.

A positioning guide according to one form of the invention is shown generally at 10 in FIGS. 1-4. The positioning guide 10 is shown in relation to a conventional fifth wheel towed vehicle 12, such as a recreational vehicle, the forward portion of which is illustrated in the drawing figures. For towing purposes, the fifth wheel towed vehicle 12 includes a pin box assembly 14 which may be conventional and is therefore not described in greater detail.

The positioning guide 10 is located on a cover 16 for the pin box assembly 14. The cover 16 is attachable to the pin box assembly 14 in a conventional fashion (not illustrated), as will be well known to those skilled in the art. Screws, bolts and the like are typical means of attachment.

The positioning guide 10 includes a mirror 18. The mirror 18 is secured to the cover 16 or, as illustrated, can be an integral portion of the cover 16.

The mirror 18 is oriented in a cowl 20 to be visible from a towing vehicle (not illustrated), when the towing vehicle is backed toward the towed vehicle 12. Thus, when the person backing the towing vehicle toward the towed vehicle 12 sees the mirror 18, that person will also see, in the mirror 18, the attachment on the towed vehicle for engaging the pin 22 of the pin box assembly 14. Therefore, easy connection between the fifth wheel towed vehicle 12 and the towing vehicle can be accomplished.

A second form of positioning guide 10' is shown in FIGS. 5-7. In this form of the invention, the positioning guide 10', as in the first form of the invention, includes a cowl 24 forming an integral extension of a pin box cover 26. A mirror 28 is mounted in the cowl 24 and, as best shown in FIG. 5, the mirror 28 is convex, providing a greater viewing area when a towing vehicle is backed toward the towed vehicle for connection thereto.

To aid in connection to a towed vehicle, the positioning guide 10' also includes a sight line in the form of a central protrusion 30 extending above the cowl 26. As illustrated, the protrusion 30 can be an integral portion of the cowl 24, or can be an element added to the cowl, as appropriate. The protrusion 30 helps a person "target" the pin 22 of the pin box assembly when connecting a towed vehicle to the towing vehicle.

The invention provides a simple yet effective aid in connecting a fifth wheel towed vehicle to a towing vehicle. Various changes can be made to the invention without departing from the spirit thereof or scope of the following claims.

What is claimed is:

1. A positioning guide for aiding connection of a fifth wheel towed vehicle to a towing vehicle, the fifth wheel towed vehicle having a pin box assembly extending from the fifth wheel towed vehicle for connection to the towing vehicle, the positioning guide comprising:
   a. a cover for the pin box assembly, said cover directly connected to a forward portion of pin box assembly and covering a portion of the pin box assembly, and
   b. a mirror secured to said cover and located at an orientation to be visible from the towing vehicle when said cover is attached to the pin box assembly.

2. The positioning guide according to claim 1, in which said mirror is convex.

3. The positioning guide according to claim 1, in which said mirror is located in a cowl on said cover.

4. The positioning guide according to claim 3, in which said cowl and said cover are integral.

5. The positioning guide according to claim 1, including a sight line proximate said mirror.

6. The positioning guide according to claim 5, in which mirror is located in a cowl on said cover, and said cowl sight line comprises a protrusion on said cowl.

* * * * *